United States Patent
Weber

(10) Patent No.: US 7,019,992 B1
(45) Date of Patent: Mar. 28, 2006

(54) CAPACITIVELY COUPLED POWER SUPPLY

(75) Inventor: Rudolf Weber, Meilen (CH)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/531,118

(22) PCT Filed: Oct. 16, 2003

(86) PCT No.: PCT/IB03/05308

§ 371 (c)(1),
(2), (4) Date: Apr. 11, 2005

(87) PCT Pub. No.: WO2004/038902

PCT Pub. Date: May 6, 2004

Related U.S. Application Data

(60) Provisional application No. 60/418,823, filed on Oct. 16, 2002.

(51) Int. Cl.
*H02M 3/07* (2006.01)

(52) U.S. Cl. ........................................................ 363/63

(58) Field of Classification Search ................ 323/293, 323/364; 363/62
See application file for complete search history.

(56) References Cited

U.S. PATENT DOCUMENTS

| | | | | |
|---|---|---|---|---|
| 3,497,792 A | * | 2/1970 | Mlynar | 363/62 |
| 4,578,772 A | * | 3/1986 | Fujii | 708/844 |
| 4,649,468 A | * | 3/1987 | Cubbison, Jr. | 363/62 |
| 4,801,887 A | | 1/1989 | Wegener | |
| 4,841,427 A | * | 6/1989 | Miyazaki et al. | 363/62 |
| 5,245,524 A | * | 9/1993 | Nakagawa et al. | 363/62 |
| 5,596,489 A | * | 1/1997 | Bazes | 363/62 |
| 6,046,916 A | | 4/2000 | Wuidart et al. | |
| 6,693,808 B1 | * | 2/2004 | Myono | 363/62 |
| 6,879,502 B1 | * | 4/2005 | Yoshida et al. | 363/60 |

FOREIGN PATENT DOCUMENTS

| | | |
|---|---|---|
| DE | 4040841 | 6/1992 |
| EP | 0855790 | 7/1998 |
| EP | 1174998 | 1/2002 |

\* cited by examiner

*Primary Examiner*—Jeffrey Sterrett
(74) *Attorney, Agent, or Firm*—Joseph S. Tripoli; Harvey D. Fried; Christine Johnson

(57) ABSTRACT

A power supply comprises a pair of first and second capacitors forming a capacitive voltage divider. A source of a periodic input supply voltage is coupled to the capacitive voltage divider for producing in the second capacitor, from a portion of the periodic input supply voltage, a second supply voltage that is coupled to a load circuit. A switch is coupled to the second capacitor for selectively coupling the first capacitor to the second capacitor in a manner to regulate the second supply voltage.

10 Claims, 3 Drawing Sheets

US 7,019,992 B1

CAPACITIVELY COUPLED POWER SUPPLY

RELATED APPLICATIONS

This application claims the benefit, under 35 U.S.C. § 365 of International Application PCT/IB03/05308, filed Oct. 16, 2003, which was published in accordance with PCT Article 21(2) on May 6, 2004 in English and which claims the benefit of U.S. provisional patent application No. 60/418,823, filed Oct. 16, 2002.

FIELD OF THE INVENTION

The present invention relates to power supplies in general, and more particularly, to generating a supply voltage using a capacitive voltage divider.

BACKGROUND OF THE INVENTION

Power supplies serve the purpose of converting an input voltage into one or several output voltages. An AC power source may be used to provide an AC power line input, which gets converted to a DC regulated output voltage. Moreover, a power supply that produces a lower output voltage than that of the rectified main voltage power supply is generally needed in order to power small signal devices such as integrated circuit (1C) controllers and the like. Such power supplies should minimize losses occurring therein. While step down transformers have been used as power supplies, such devices tend to be large, bulky, and relatively expensive. A regulated power supply that utilizes capacitive elements to transform an input voltage from an AC power source to a specified output voltage level across a load is desired.

SUMMARY OF THE INVENTION

According to an aspect of the present invention, a power supply comprises a pair of first and second capacitors forming a capacitive voltage divider. A source of a periodic input supply voltage is coupled to the capacitive voltage divider for producing in the second capacitor, from a portion of the periodic input supply voltage, a second supply voltage that is coupled to a load circuit. A switch is coupled to the second capacitor for selectively coupling the first capacitor to the second capacitor in a manner to regulate the second supply voltage.

According to another aspect of the present invention, a power supply using a controlled capacitive divider comprises a first capacitor and a second capacitor that is selectively coupled to the first capacitor by means of a switch. A control circuit senses the voltage across one of the first and second capacitors; and provides a control signal to cause the switch to selectively couple the first and second capacitors.

DETAILED DESCRIPTION

Figure 1:
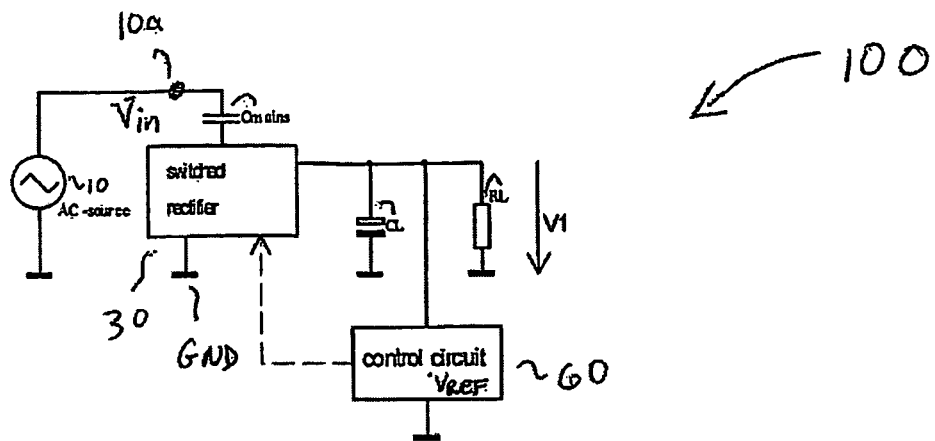
FIG. 1 is an exemplary illustration of a capacitively coupled power supply according to an exemplary embodiment of the present invention.

FIG. 1 is a block diagram illustrating a circuit 100 for generating a regulated supply voltage using a capacitive divider according to the general principles embodying the present invention. Throughout the drawings, like reference numerals are used to indicate like parts. The circuit 100 includes a source 10 of AC power applied at node 10a. A voltage or a current source may be used, however, in case of a mains application, it is understood that the source comprise an AC power line input A capacitive divider comprising capacitor Cmains and capacitor CL connected in series, is used to transform the input voltage (Vin) at node 10a to the desired output voltage level V1 across load device RL. Since the energy transfer is determined by the capacitor Cmains, a voltage source can automatically be considered as a current source.

Control circuit 60 coupled to the voltage divider arrangement measures the output voltage V1 and compares the measured output voltage with a reference voltage Vref in order to control switched rectifier circuit 30. There exist two basic arrangements for the switched rectifier circuit 30. The first arrangement disables the further charge of capacitor CL as soon as a desired output voltage level (V1=Vref) is reached. This arrangement may be implemented as a forward controlled shunt switch. The second arrangement enables a faster discharge of capacitor CL as long as the output voltage (V1) exceeds the desired value (Vref). This arrangement may be implemented as a controlled series switch, whose return current is controlled. These two basic implementations are shown in greater detail in FIGS. 2 and 3, respectively.

Figure 2:
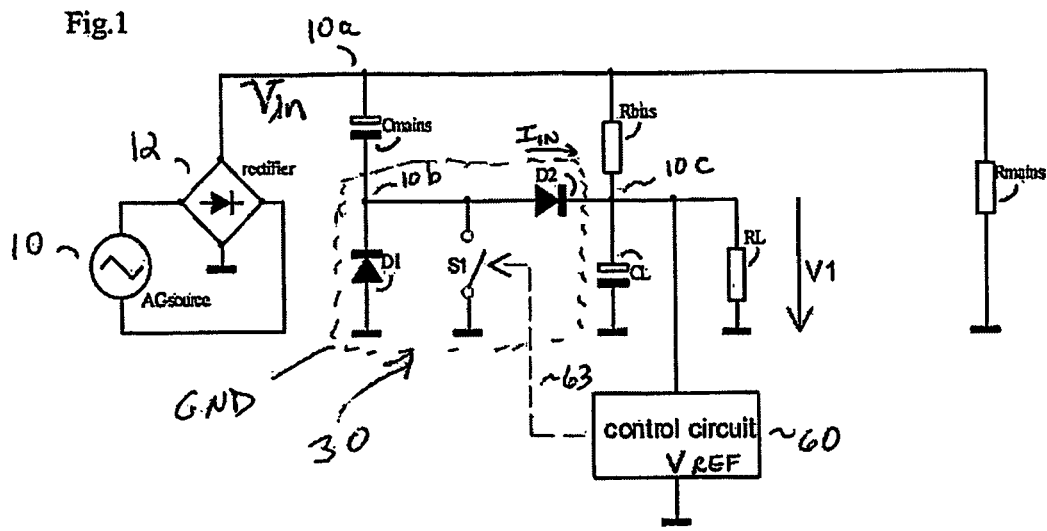
FIG. 2 is an exemplary illustration of a capacitively coupled power supply according to another exemplary embodiment of the present invention.

In an exemplary application, generation of auxiliary power in a switch mode power supply may be accomplished in the following manner. Referring now to FIG. 2, a source of periodic input voltage Vin is developed at node 10a from AC source 10 coupled to rectifier 12. Filter capacitor Cmains has a first terminal connected to node 10a, and a second terminal connected to node 10b. Diode D1 is coupled in reverse-bias fashion between node 10b and ground potential (GND). Filter capacitor Cmains is coupled to capacitor CL via diode D2 in a voltage divider arrangement. Capacitor CL has a first terminal connected at node 10c to the cathode of diode D2, and a second terminal connected to GND. Switch S1 is connected between node 10b and GND, in parallel with diode D1. Control circuit 60 is coupled in parallel with load resistor RL and capacitor CL at node 10c. Bias resistor Rbias is connected between nodes 10a and 10c. Note that when diode D2 is forward biased (i.e. conducting), nodes 10b, 10c are at substantially the same potential, except for the relatively small voltage drop across diode D2. The resistor Rbias has a relatively large value and delivers the start up voltage (V1) for a common used primary controller IC. Resistor Rmains represents the main load resistance and is connected between the input node 10a and GND.

Control circuit 60 is communicatively coupled (represented by dashed line 63) to switch S1, which selectively couple capacitors Cmains and CL. Control circuit 60 senses output voltage V1 and compares the output voltage with a predetermined reference voltage Vref to generate a control signal to cause S1 to open or close, thereby switchably coupling/decoupling the electrical path between Cmains and CL. Output voltage V1 at node 10c is used for the primary switch control circuit or controller 60. In an exemplary embodiment, the switch control circuit may be a pulse width modulated (PWM) control circuit or any other type of switch controlling arrangement. It is understood that capacitor Cmains couples the AC signal to the switched rectifier circuit 30 and controller 60.

The DC voltage Vin is further applied across the representative main load resistance Rmains.

For the case where CL>>Cmains, the capacitor Cmains essentially operates as a filter capacitor to filter the periodic input signal applied at node 10a. The transferred energy in CL is much smaller than the energy in Cmains. Capacitor CL is charged through conducting diode D2 and the capacitor by the rectified input current Iin, when switch S1 is open. This results in an increasing voltage across Cmains and CL as long as a charge current flows. When the input voltage of AC source 10 is below the voltage Vin, the rectifier 12 decouples the AC source 10 from the rest of the circuit (i.e. node 10a). At this time, capacitor Cmains delivers current to load Rmains by means of conducting diode D1. In this case, no current path exists between Cmains and CL, as diode D2 serves to block any current flowing there between. A relatively small current flowing through CL is discharged through load resistor RL. Note that the discharge current flowing through CL is only feeding the control circuit 60 and load RL, which represents the standby power supply, for example, in a television set (which is e.g. 1–3 Watts). This is significantly less than the current being discharged through diode D1, capacitor Cmains and Rmains representing the main load of the TV set (which is, e.g., 100–150 Watts). Because diode D2 becomes reverse biased, the voltage V1 across CL remains positive, and its drop is only determined by the auxiliary load resistor RL.

According to an aspect of the invention, the charge condition of Cmains mainly determines the charge in CL. More particularly, after a first discharging period wherein Cmains is discharged, during the next cycle of the mains, the capacitor Cmains is charged while at the same time, capacitor CL is charged, due to the conduction of diode D2. Note that in one embodiment, CL is approximately 3–4 times greater than that of Cmains (e.g. Cmains is about 68 uF (micro Farads) while CL is 220 uF). Note that the voltage at Rmains and RL has a ratio that is chosen to obtain the desired output voltage V1. However, Rmains for the main power supply often varies in a wide range. For example, since Rmains is typically the main power supply for any consumer electronic device, such as a TV, its power may range anywhere from 50 W to 150 W depending on factors such as sound, picture parameters and the like, within the range of the run mode of the device. However, the standby output power of V1 may drop down to 1 W (Watt) or less. Moreover, the load RL remains substantially constant in order to feed small signal devices such as a microprocessor, controller, and IR receivers, for example.

As shown in FIG. 2, switch S1 is configured as a switched shunt controller arrangement, wherein S1 closes in response to a signal from control circuit 60, thereby disabling further charging of CL as soon as the desired output voltage at node 10c is reached. In this manner, by opening and closing switch S1, the output voltage V1 across RL may be controlled. This implementation is useful in providing a circuit arrangement when the output voltage should not exceed a predetermined level. More particularly, as soon as the desired output voltage level at CL is reached and sensed by control circuit 60, switch S1 closes so that the current path exists through Cmains, S1 and back to the input, without further charging at CL, to thereby maintain the voltage V1. Note that S1 can be closed or open within 1 cycle of the 50 or 60 Hz input sinusoid.

Figure 3:
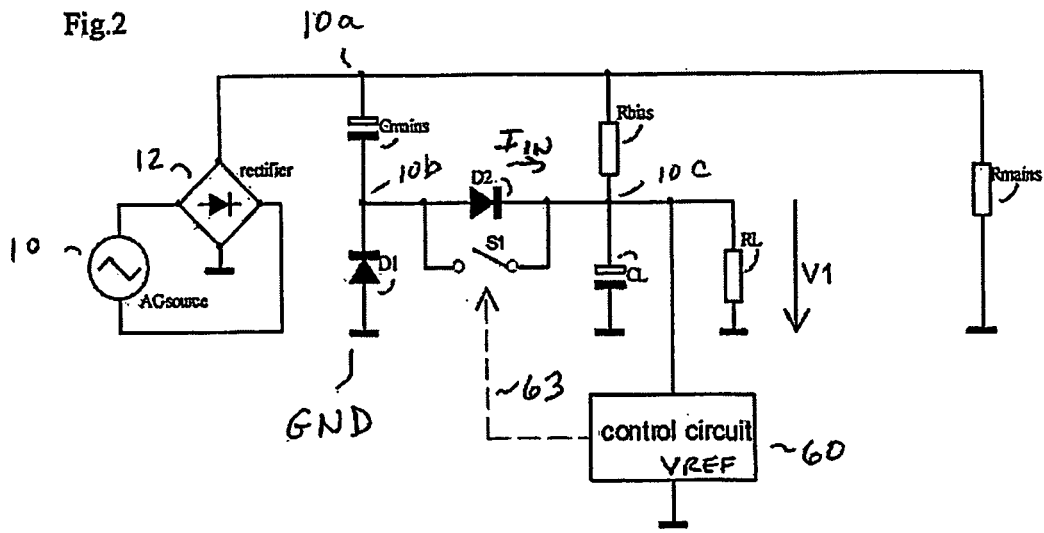
FIG. 3 is an exemplary illustration of a capacitively coupled power supply according to another exemplary embodiment of the present invention.

Another embodiment is shown in FIG. 3. The embodiment of FIG. 3 differs from that of FIG. 2 in that switch S1 is connected between nodes 10b and 10c in parallel with conducting diode D2. In this case, the maximum output voltage V1 is not precisely determined as a threshold limit. The switch S1, in response to a signal from control circuit 60, closes to enable a discharge path from CL through S1 and Cmains to Rmains. Opening of the switch disables the further discharge to Rmains as soon as a minimal desired output voltage is reached. In this implementation, the output voltage across RL is not controlled during the charging cycle (when S1 is open). The above described embodiment provides a useful solution whenever a voltage limiter like a series regulator is followed. The solution according FIG. 3 advantageously does not produce current transients in Cmains and in the line rectifier. From the above described embodiments shown in FIGS. 2 and 3, the charge is controlled in the embodiment of FIG. 2, while the discharge is controlled in the embodiment of FIG. 3.

Figure 4:
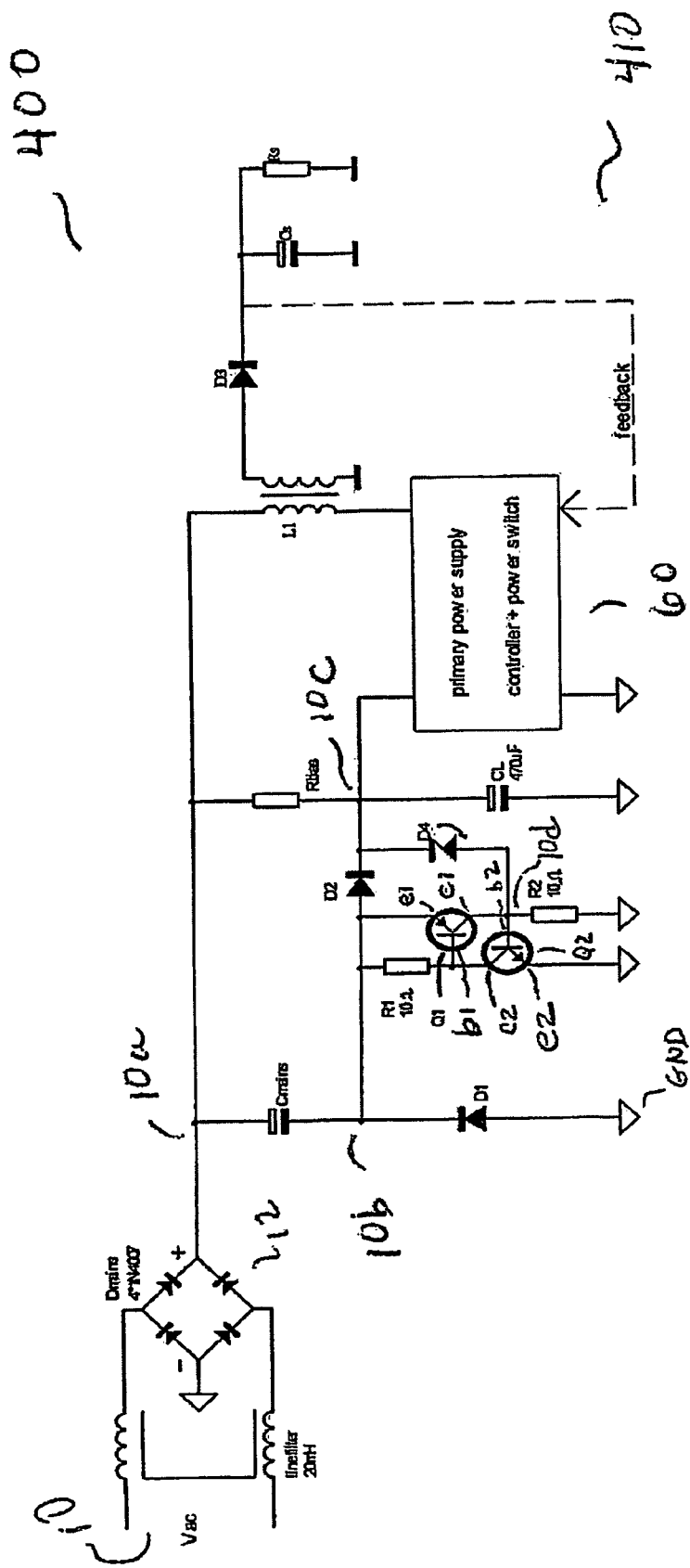
FIG. 4 is an exemplary illustration of a capacitively coupled power supply according to another exemplary embodiment of the present invention.
Figure 5:
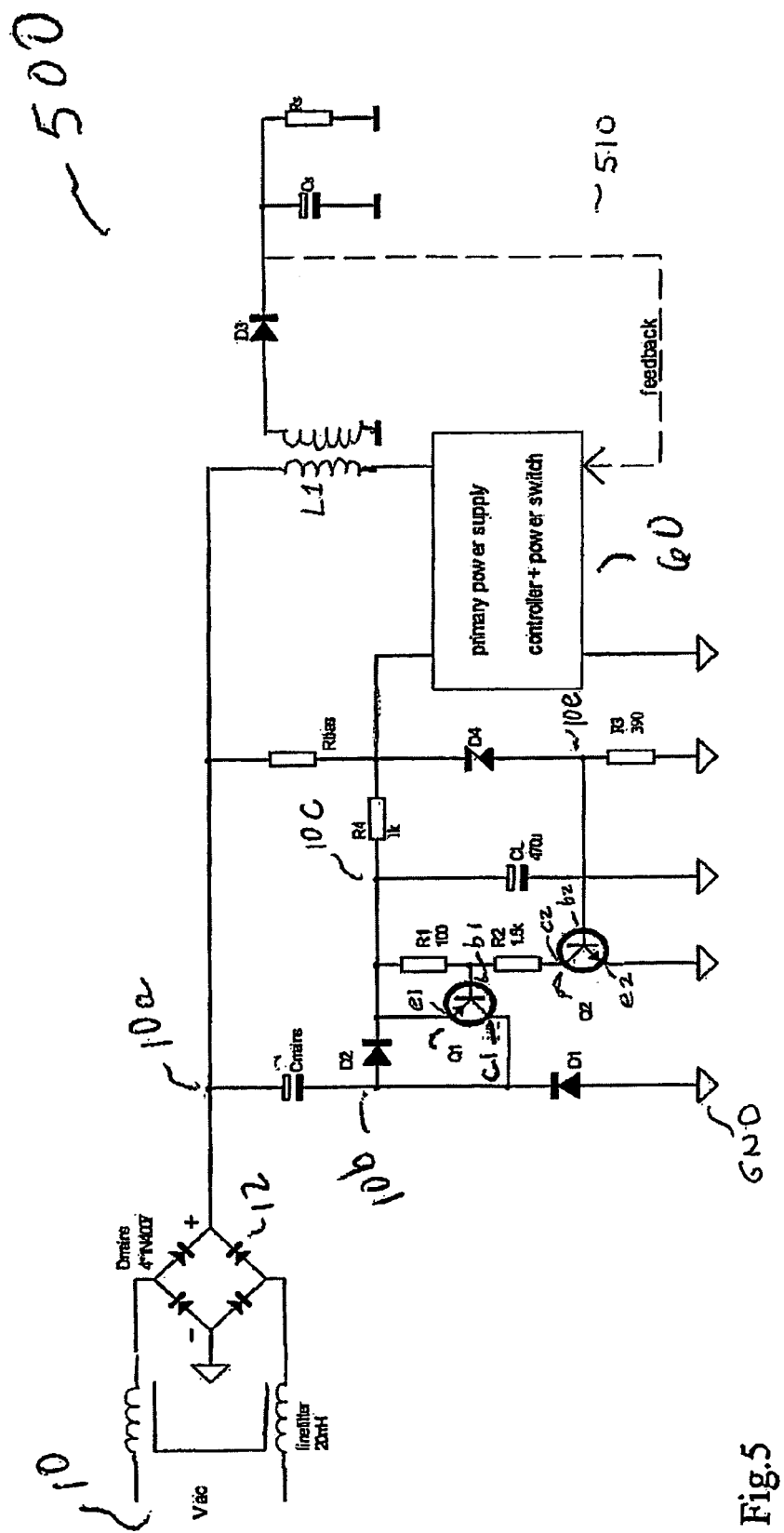
FIG. 5 is an exemplary illustration of a capacitively coupled power supply according to another exemplary embodiment of the present invention.

Detailed circuit diagrams implementing the schematic representations of FIGS. 2 and 3, are shown in FIGS. 4 and 5, respectively. As shown therein, an arrangement for generating auxiliary power for a common used primary controller of a switch mode power supply is implemented. The initial start up voltage is provided by Rbias. In normal run mode, the power consumption for the controller is higher than resistor Rbias can deliver. Here, the tapped capacitors Cmains and CL support the power to the controller as described above. The representative switch S1 in FIG. 2 is established by means of high gain transistors Q1 and Q2 of FIG. 4. As shown in FIG. 4, pnp transistor Q1 has its base terminal b1 connected to terminal c2 of transistor Q2. Terminal e1 of Q1 is connected to node 10b, while terminal c1 of Q1 is connected to base terminal b2 of npn transistor Q2. Terminals c1, b2 are connected at node 10d, which is coupled to GND through resistor R2. Resistor R1 couples terminals b1, c2 of Q1, Q2, respectively, to node 10b. Zener diode D4 is coupled between node 10c and node 10d. The output voltage is sensed by diode D4 and directly controls the high gains transistors Q1, Q2. The circuit 400 may be embodied in a free running power oscillator, whose operation is enabled/disabled depending on the output voltage from the secondary side 410. As previously mentioned, the initial startup voltage is provided by Rbias. As long as the voltage across CL is below a threshold, the current path from Cmains through D2 to CL is established, and the capacitors Cmains and CL continue to charge. However, upon operation of the power oscillator, the power consumed by the oscillator is higher than Rbias can deliver. Thus, the energy stored in Cmains and CL are used to power the drivers of the power oscillator.

In analogous fashion, switch S1 of FIG. 3 is implemented as transistor Q1 in the circuit arrangement 500 illustrated in FIG. 5. As shown in FIG. 5, pnp transistor Q1 has its base terminal b1 connected to terminal c2 of npn transistor Q2 through resistor R2. Terminal e1 of Q1 is connected to the anode of diode D2, while terminal c1 of Q1 is connected to the cathode of diode D2 at node 10b. Resistor R1 is connected between the anode of D2 and terminal b1 of Q1 in a voltage divider arrangement with R2. Diode D1 is connected between node 10b and GND. Base terminal b2 of npn transistor Q2 is connected to Zener diode D4 at node 10*e*. Resistor R3 is connected between node 10*e* and GND, while the cathode of diode D4 is connected to node 10*c* through resistor R4. Terminal e2 of transistor Q2 is connected to GND. Here, Zener Diode D4 limits the drive voltage at the input of the controller 60 to a given or predetermined value. Diode D4 controls Q1 via the driver Q2. Thus, capacitor CL remains switchably coupled to Cmains and to the main load Rmains, corresponding to the transformed load Rs on the secondary side, until the desired minimal voltage at the input of controller 60 is reached. At that time, capacitor CL is discharged through control circuit 60 by the relatively low current required for the controller. This takes place until the next charge interval arrives in Cmains. As an alternative arrangement, diode D4 could be part of a common used series voltage limiter or stabilization circuit.

Although the invention has been described in terms of exemplary embodiments, it is not limited thereto. The appended claims should be construed broadly to include other variants and embodiments of the invention which may be made by those skilled in the art without departing from the scope and range of equivalents of the invention.

The invention claimed is:

1. A power supply comprising:
   a source of an energizing supply voltage;
   a first capacitor;
   a second capacitor;
   a switch for periodically coupling said first capacitor and said second capacitor to form a capacitive voltage divider with respect to said energizing supply voltage to produce a first portion of an output in said second capacitor; and
   an impedance coupled to said source of said energizing supply voltage and to said second capacitor in a manner that bypasses said first capacitor for producing a second portion of the output in said second capacitor.

2. The power supply of claim 1, wherein said switch is coupled to said second capacitor for selectively coupling said first capacitor to said second capacitor in a negative feedback manner to regulate said second supply voltage.

3. The power supply of claim 1, wherein the switch is responsive to a control signal from a control circuit which senses said second portion of the output and compares said sensed voltage with a reference voltage, for selectively coupling said first capacitor to said second capacitor.

4. The power supply of claim 1, wherein said switch is coupled between said first and second capacitors and responsive to a control signal from a control circuit for selectively coupling said first and second capacitors.

5. The power supply of claim 1, wherein the switch comprises a shunt circuit across said second capacitor for selectively coupling said first and said second capacitors.

6. The power supply of claim 1, wherein the switch comprises at least one transistor.

7. The power supply of claim 1, wherein a first diode is coupled between the first and second capacitors, and wherein said second capacitor has a first terminal coupled to a reference potential.

8. The power supply of claim 7, wherein a second diode is coupled between the first capacitor and said reference potential.

9. The power supply of claim 1, wherein the source of energizing supply voltage comprises an AC source coupled to a rectifier.

10. The power supply of claim 1, wherein said switch varies a charge transfer between the first and second capacitors when one of said first and second capacitors is charged in a first direction, and is prevented from varying a charge transfer between first and second capacitors when said one of said first and second capacitors is charged in a second direction opposite said first direction.

* * * * *